(12) United States Patent
Gill et al.

(10) Patent No.: US 9,068,370 B1
(45) Date of Patent: Jun. 30, 2015

(54) WIND RESISTANT MODULAR ISO BUILDING

(71) Applicants: Peter E. Gill, Tamuning, GU (US);
Peter E. Gill, III, Milwaukee, WI (US)

(72) Inventors: Peter E. Gill, Tamuning, GU (US);
Peter E. Gill, III, Milwaukee, WI (US)

( * ) Notice: Subject to any disclaimer, the term of this patent is extended or adjusted under 35 U.S.C. 154(b) by 0 days.

(21) Appl. No.: 14/217,521

(22) Filed: Mar. 18, 2014

Related U.S. Application Data

(60) Division of application No. 14/143,057, filed on Dec. 30, 2013, which is a continuation of application No. 13/870,141, filed on Apr. 25, 2013, now Pat. No. 8,640,396.

(51) Int. Cl.
*E04H 1/12* (2006.01)
*E04H 3/00* (2006.01)

(52) U.S. Cl.
CPC .. *E04H 3/00* (2013.01); *E04H 1/12* (2013.01); *E04H 2001/1283* (2013.01)

(58) Field of Classification Search
CPC ............. E04H 1/00; E04H 1/005; E04H 1/12; E04H 2001/1283; E04H 3/00; E04B 1/34336; E04B 1/348; E04B 1/34807; E04B 1/34815; E04B 1/3483; E04B 1/34861; E04B 2001/34389; E04B 2001/34876; E04B 2001/34884; E04B 2001/34892
See application file for complete search history.

(56) References Cited

U.S. PATENT DOCUMENTS

| | | | |
|---|---|---|---|
| 3,540,173 A | 11/1970 | Johnides | |
| 4,854,094 A * | 8/1989 | Clark | 52/79.1 |
| 5,706,614 A * | 1/1998 | Wiley et al. | 52/79.1 |
| 6,405,506 B2 * | 6/2002 | Ruff | 52/656.4 |
| 8,001,730 B2 * | 8/2011 | Wallance | 52/79.1 |
| 8,555,559 B2 * | 10/2013 | DiGregory | 52/79.5 |
| 2005/0115168 A1 * | 6/2005 | Bealko | 52/97 |

* cited by examiner

*Primary Examiner* — Jessica Laux
(74) *Attorney, Agent, or Firm* — Donald J. Ersler

(57) ABSTRACT

A wind resistant modular ISO building includes a first cargo container, a second cargo container, and a mounting system. The first and second cargo containers are joined to each other by attaching adjacent lengthwise frame rails. Most of an inner lengthwise side wall of the first and second cargo containers is removed. The first and second cargo containers are also joined to each other by attaching a plurality of vertical channels of upper portions of the lengthwise side walls. A plurality of horizontal channels are attached to the plurality of vertical channels. At least two moment frames are attached to an inside of the first and second cargo containers. The end door of the first and second cargo containers are replaced with an end panel. Preferably, at least one door entrance and window system is formed in at least one of the lengthwise side walls.

11 Claims, 21 Drawing Sheets

WIND RESISTANT MODULAR ISO BUILDING

CROSS-REFERENCES TO RELATED APPLICATIONS

This divisional patent application claims the benefit of patent application Ser. No. 14/143,057 filed on Dec. 30, 2013, which claims the benefit of patent application Ser. No. 13/870,141 filed on Apr. 25, 2013, now U.S. Pat. No. 8,640,396.

BACKGROUND OF THE INVENTION

1. Field of the Invention

The present invention relates generally to temporary structures and more specifically to a wind resistant modular ISO building, which is fabricated by joining two cargo containers along lengthwise surfaces thereof.

2. Discussion of the Prior Art

U.S. Pat. No. 3,540,173 to Johnides discloses expandable, transportable, prefabricated containerized buildings. U.S. Pat. No. 4,854,094 to Clark discloses a method for converting one or more steel shipping containers into a habitable building at a building site and the product thereof. U.S. Pat. No. 8,001,730 to Wallance discloses a system for modular building construction.

Accordingly, there is a clearly felt need in the art for a wind resistant modular ISO building, which is fabricated by joining two cargo containers along lengthwise surfaces thereof and cutting out a portion of the attached lengthwise surfaces to create a single inner space; and which is suitable for surviving cyclones, hurricanes and typhoons.

SUMMARY OF THE INVENTION

The present invention provides a wind resistant modular ISO building, which is fabricated by joining two cargo containers along lengthwise surfaces thereof. The wind resistant modular ISO building preferably includes a first cargo container, a second cargo container and a mounting system. Each cargo container includes a bottom frame, two lengthwise side walls, an end wall, a top plate, a floor plate and an end door. The bottom frame includes two lengthwise frame rails and two end frame rails. The ends of the two lengthwise frame rails and the two end frame rails are attached to each other. Each lengthwise frame rail includes at least one grappler pocket on each end thereof. Each lengthwise side wall includes a lengthwise side sheet and a plurality of vertical channels attached to an inside surface of the lengthwise side sheet. A bottom of the two lengthwise side walls are attached to a top of the two lengthwise frame rails and a bottom of the end wall is attached to one of the two end frame rails. The grappler pockets of the first and second cargo members are attached to each other, preferably by welding. The inside lengthwise side wall at the first and second ends of the first and second cargo containers are welded along a portion of the height thereof.

Most of an inner lengthwise side wall of the first and second cargo containers is removed to form a first attachment strip and a second attachment strip. The first and second cargo containers are joined to each other by attaching adjacent lengthwise frame rails of the first and second cargo containers with a plurality of frame fasteners. The first and second cargo containers are also joined to each other by attaching the plurality of vertical channels of the upper portions of the lengthwise side walls with a plurality of wall fasteners. A plurality of horizontal channels are attached to the plurality of vertical channels of outer lengthwise side walls of the first and second cargo containers.

At least two moment frames are attached to an inside of the first and second cargo containers. Each moment frame includes a first vertical moment member, a second vertical moment member and a horizontal moment member. A first end of the horizontal moment member is attached to a top of the first vertical moment member and a second end of the horizontal moment member is attached to a top of the second vertical moment member. The first vertical moment member is attached to one of the plurality of vertical channels on the lengthwise side wall of the first cargo container with a plurality of moment fasteners. The second vertical moment member is attached to one of the plurality of vertical channels on the lengthwise side wall of the second cargo container with a plurality of moment fasteners. The upper portion of the first and second inner lengthwise side walls are attached to a top of the horizontal moment member by welding a pair of angle members thereto.

A plurality of cement boards are attached to the floor plates of the first and second cargo containers with fasteners or the like. Each cement board has a rectangular shape. It is preferable that a length of the cement boards be attached across a seam between the first and second cargo containers. The length of the other cement boards would be parallel to a length of the first and second cargo containers. A gooseneck tunnel is normally formed in a bottom of the cargo container at one end thereof. The first and second cargo containers are attached to each other, such that the two gooseneck tunnels are located at opposing ends of the first and second cargo containers. A layer of foam is preferably sprayed on a top of the top plates of the first and second cargo containers to improve rigidity. A thickness of the foam is preferably two inches, but other thicknesses may also be used. It is also preferable that the foam is a HSF 210 Polyurethane-Rigid-Spray-Foam, Class 1, but other foams may also be used. The foam may be purchased from ITWC, Inc. of Riverside, Calif.

The end doors of the first and second cargo containers are replaced with an end panel. The end panel preferably includes a end plate and an inner stud frame. The inner stud wall includes a bottom horizontal stud, a top horizontal stud and a plurality of vertical studs. The bottom horizontal stud is attached to one end of the plurality of vertical studs with a plurality of fasteners and the top horizontal stud is attached to the other end of the plurality of vertical studs with the plurality of fasteners. The studs are attached to an inside surface of the end plate with a plurality of plate fasteners. The end plate is attached to an end frame of the cargo container with a plurality of frame fasteners.

At least one door entrance is formed in at least one of the lengthwise side walls of the wind resistant modular ISO building. Each door entrance preferably includes a door, a door frame and a support frame. The support frame includes a first vertical support, a second vertical support and a horizontal support. Each vertical support includes a vertical member and a vertical side member. The door is pivotally retained in the door frame. The door frame includes a first vertical door frame member, a second vertical door frame member and a horizontal door frame member. A door opening is cut through the lengthwise side wall, between two vertical channels. The first and second vertical side members are attached to the two vertical channels with fasteners or the like. The first and second vertical door frame members are attached to an inside surface of the two vertical members with a plurality of frame fasteners. The horizontal support and the header stud are attached between the two vertical members with a plurality of fasteners (not shown).

At least one window system is formed in at least one of the lengthwise side walls of the wind resistant modular ISO building. Each window system preferably includes a window and a window support frame. The window support frame includes a two horizontal window support members and two vertical window support members. A window opening is cut through the lengthwise side wall, between two vertical channels. Each end of the two horizontal window support members are secured to the two vertical channels. The two vertical window support members are inserted and secured between the two horizontal window support members. The window is secured to the two horizontal window support members and the two vertical window support members.

A bulkhead is typically formed in the side walls of cargo container to provide the cargo container with structural integrity. It is preferable to modify the bulkhead formed in the inside side walls of the first and second cargo containers. A first opening is created through a first end of the first and second cargo containers, between two adjacent grappler pockets. The first opening creates two vertical pillars, a bottom horizontal strip and a top horizontal strip. The two vertical pillars are located over the grappler pockets in the first and second cargo containers. The bottom and top horizontal strips are portions of the inside side wall that extend upward from the floor and downward from the top plate.

A second opening is created through a second end of the first and second cargo containers, between two adjacent grappler pockets. The second opening creates two vertical pillars, a bottom horizontal strip and a top horizontal strip. The two vertical pillars are located over the grappler pockets in the first and second cargo containers. The bottom and top horizontal strips are portions of the inside side wall that extend upward from the floor and downward from the top plate. A third opening is created between outer vertical pillars of the first and second openings. The third opening creates a horizontal support member, which extends downward from the top plate between the outer pillars.

The bottom frames of the first and second cargo containers are supported by the mounting system. A pitched roof structure may be attached to a top and two lengthwise sides of the first and second cargo containers. However, cargo containers have their own suitable drainage system and the pitched roof structure is not necessary to remove rain from a top of the cargo containers.

Accordingly, it is an object of the present invention to provide a wind resistant modular ISO building, which is fabricated by joining two cargo containers along the lengthwise surfaces thereof and cutting out a portion of the attached lengthwise surfaces to create a single inner space.

Finally, it is another object of the present invention to provide a wind resistant modular ISO building, which is suitable for surviving cyclones, hurricanes and typhoons.

These and additional objects, advantages, features and benefits of the present invention will become apparent from the following specification.

DETAILED DESCRIPTION OF THE PREFERRED EMBODIMENTS

Figure 1:
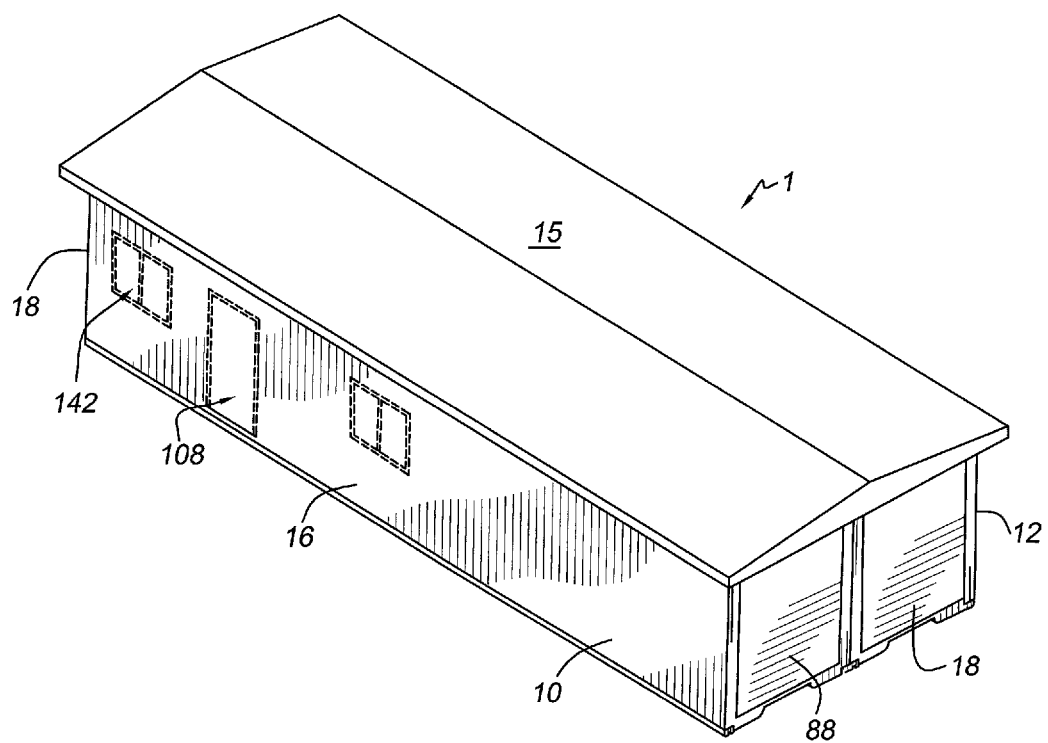
FIG. 1 is a perspective view of a wind resistant modular ISO building in accordance with the present invention.
Figure 2:
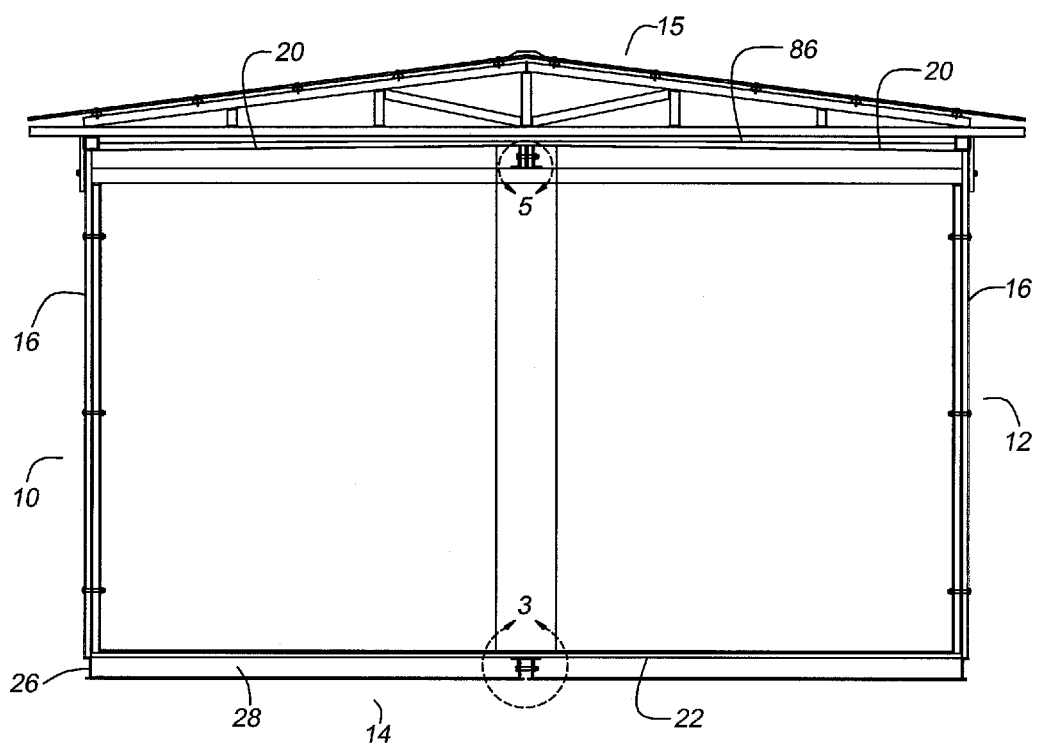
FIG. 2 is an end cross sectional view of a wind resistant modular ISO building in accordance with the present invention.
Figure 7:
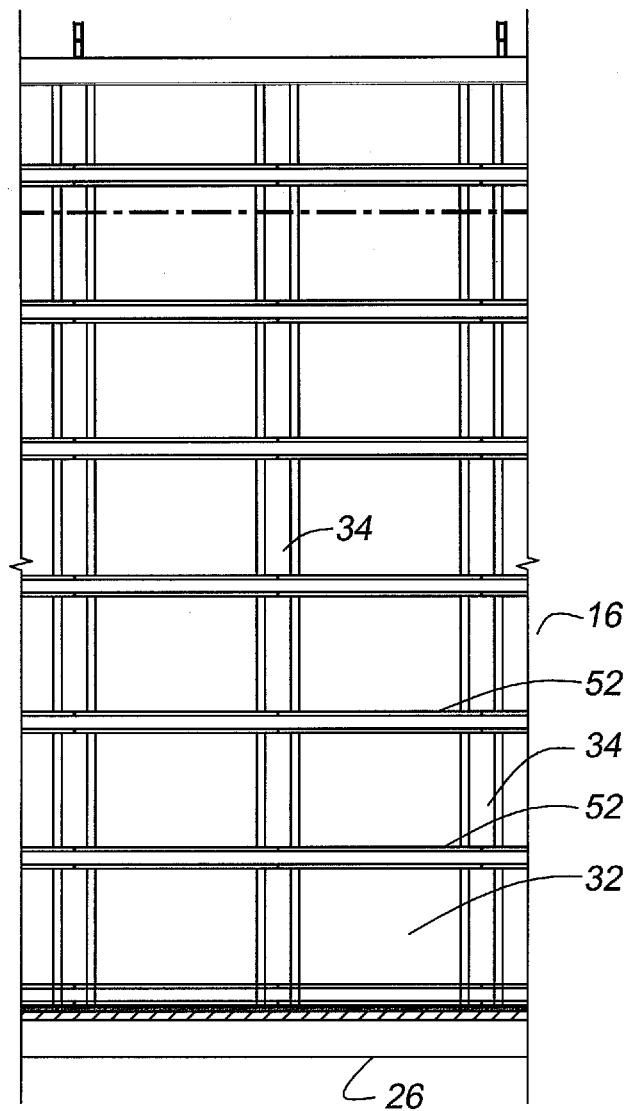
FIG. 7 is a front view of an inside surface of a lengthwise side wall with a plurality of vertical channels of a cargo container having a plurality of horizontal channels attached to the plurality of vertical channels of a wind resistant modular ISO building in accordance with the present invention.
Figure 16:
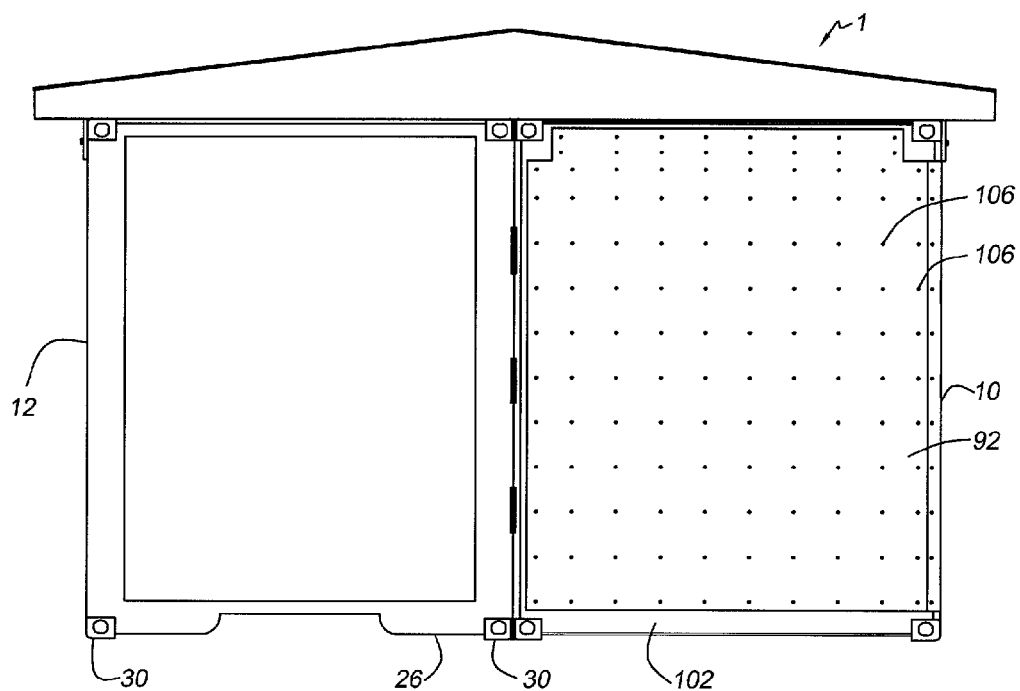
FIG. 16 is a rear end view of a cargo container with an end plate, before installation of an inner stud frame of a wind resistant modular ISO building in accordance with the present invention.

With reference now to the drawings, and particularly to FIG. 1, there is shown a perspective view of a wind resistant modular ISO building 1. With reference to FIG. 2, the wind resistant modular ISO building 1 preferably includes a first cargo container 10, a second cargo container 12, a pitched roof structure 15 and a mounting system. However, the pitched roof structure 15 is optional. Each cargo container 10, 12 includes a bottom frame 14, two lengthwise side walls 16, an end wall 18, a top plate 20, a floor plate 22 and an end door (not shown). The bottom frame 14 includes two lengthwise frame rails 26 and two end frame rails 28. The ends of the two lengthwise frame rails 26 and the two end frame rails 28 are attached to each other. With reference to FIG. 16, each lengthwise frame rail 26 includes at least one grappler pocket 30 on each end thereof. With reference to FIG. 7, each lengthwise side wall 16 includes a lengthwise side sheet 32 and a plurality of vertical channels 34 attached to an inside surface of the lengthwise side sheet 32. A bottom of the two lengthwise side walls 16 are attached to a top of the two lengthwise frame rails 26 and a bottom of the end wall 18 is attached to one of the two end frame rails 28.

Figure 3:
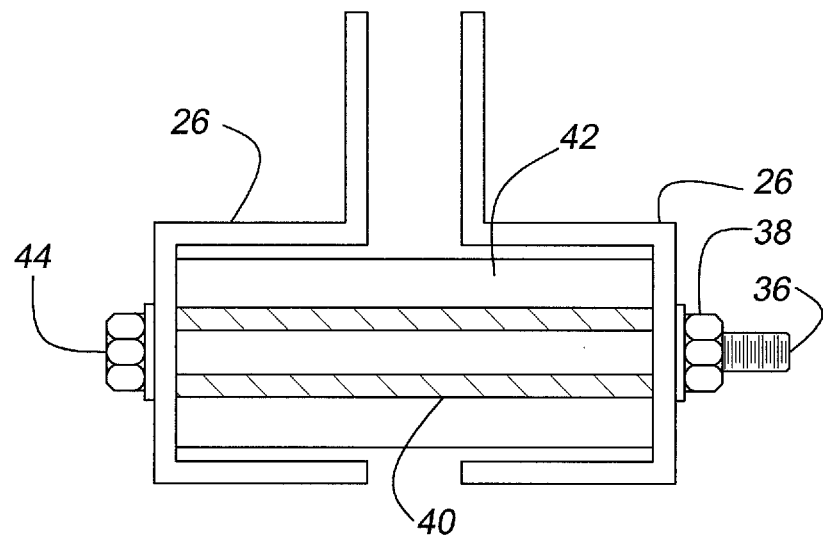
FIG. 3 is an enlarged end view of a bottom of a first cargo container attached to a bottom of a second cargo container of a wind resistant modular ISO building in accordance with the present invention.
Figure 4:
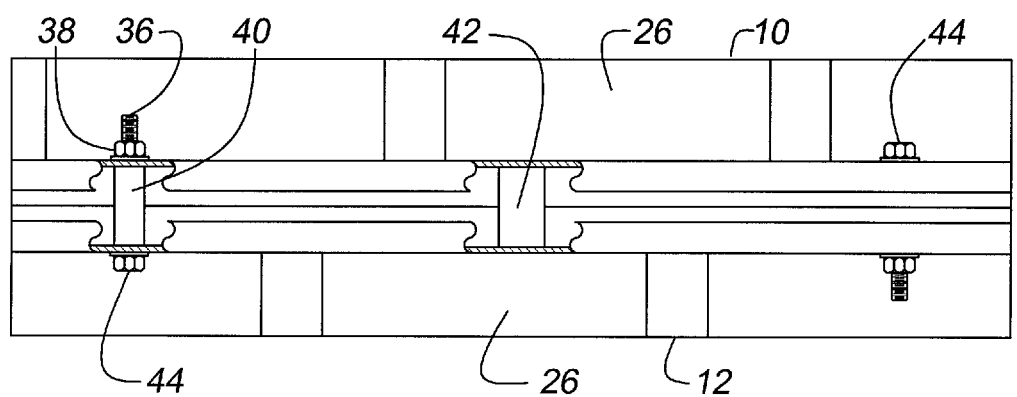
FIG. 4 is a bottom view of a portion of a first cargo container attached to a second cargo container of a wind resistant modular ISO building in accordance with the present invention.
Figure 12:
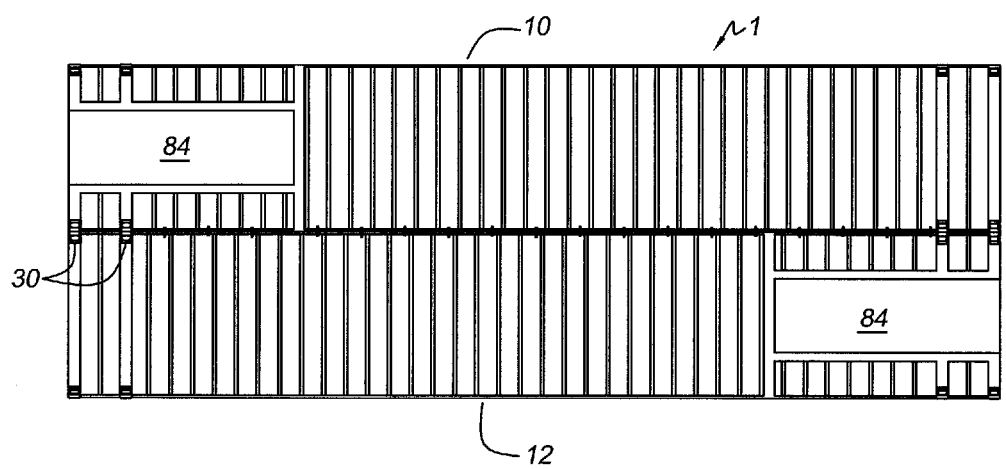
FIG. 12 is a bottom view of a wind resistant modular ISO building illustrating the opposite positioning of gooseneck tunnels of first and second cargo containers of a wind resistant modular ISO building in accordance with the present invention.
Figure 13:
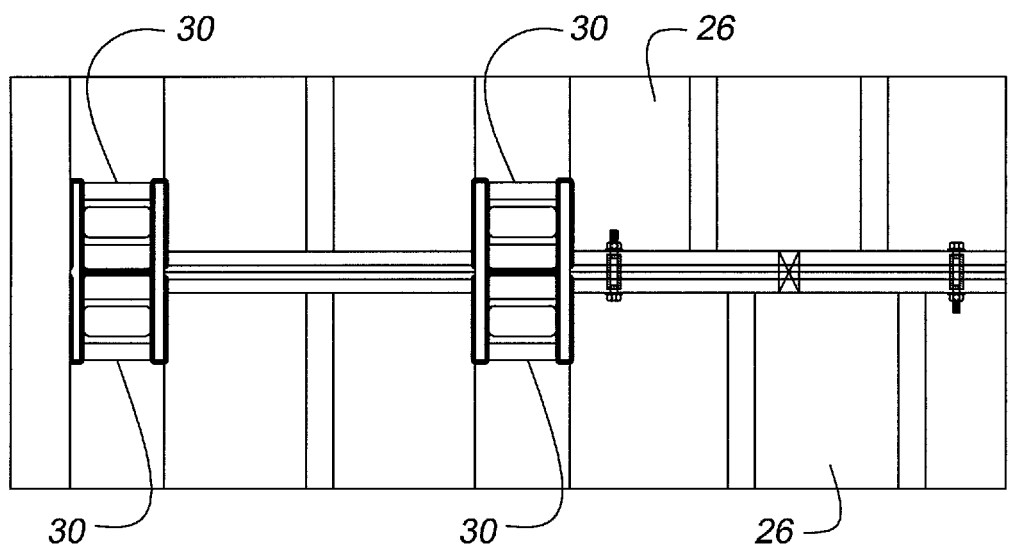
FIG. 13 is an enlarged bottom view of first and second cargo containers attached to each other by welding grappler pockets thereof together of a wind resistant modular ISO building in accordance with the present invention.

With reference to FIGS. 12, 13 and 16, the grappler pockets 30 of the first and second cargo members 10, 12 are attached to each other, preferably with welding. The inside lengthwise side wall 16 at the first and second ends of the first and second cargo containers 10, 12 are welded along a portion of the height thereof. Most of an inner lengthwise side wall 16 of the first and second cargo containers 10, 12 is removed. With reference to FIGS. 3-4, the first and second cargo containers 10, 12 are joined to each other by attaching adjacent lengthwise frame rails 26 of the first and second cargo containers 10, 12 with a plurality of bolts 36, a plurality of nuts 38, a plurality of spacer tubes 40 and plurality of spacer blocks 42. It is preferable that a head 44 of each bolt 36 be alternated, such that the head 44 is in contact with the lengthwise frame rail 26 of the first cargo container 10 and the next head 44 be in contact with the lengthwise frame rail 26 of the second cargo container 12. The spacer blocks 42 are preferably fabricated from treated wood, but other materials may also be used.

Figure 5:
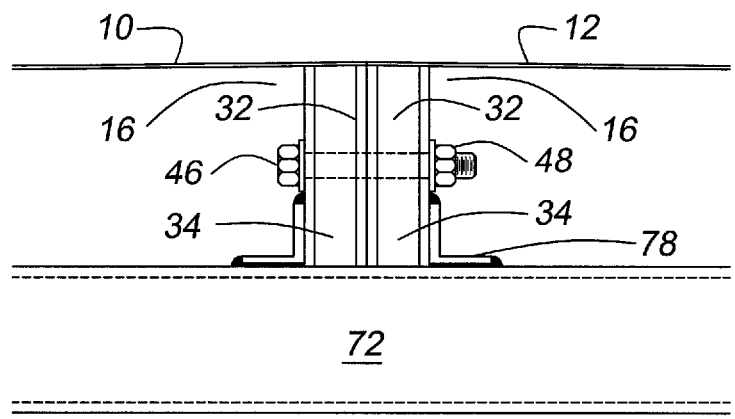
FIG. 5 is an enlarged end view of a top of a first cargo container attached to a top of a second cargo container of a wind resistant modular ISO building in accordance with the present invention.
Figure 6:
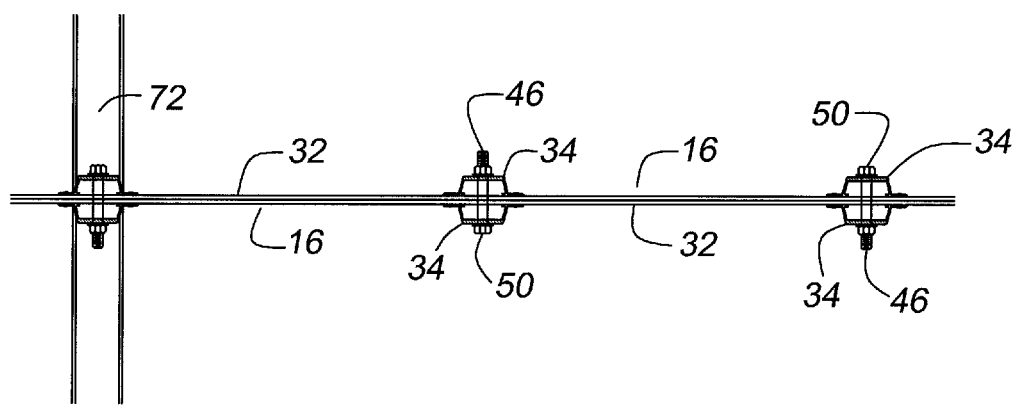
FIG. 6 is a top view of a portion of a first cargo container attached to a second cargo container of a wind resistant modular ISO building in accordance with the present invention.

With reference to FIGS. 5-6, the first and second cargo containers 10, 12 are also joined to each other by attaching the plurality of vertical channels 34 of the upper portions of the lengthwise side walls 16 with a plurality of bolts 46 and a plurality of nuts 48. It is preferable that a head 50 of each bolt 46 be alternated, such that the head 50 is in contact with the vertical channel 34 of the first cargo container 10 and the next head 50 be in contact with the vertical channel 34 of the second cargo container 12.

Figure 8:
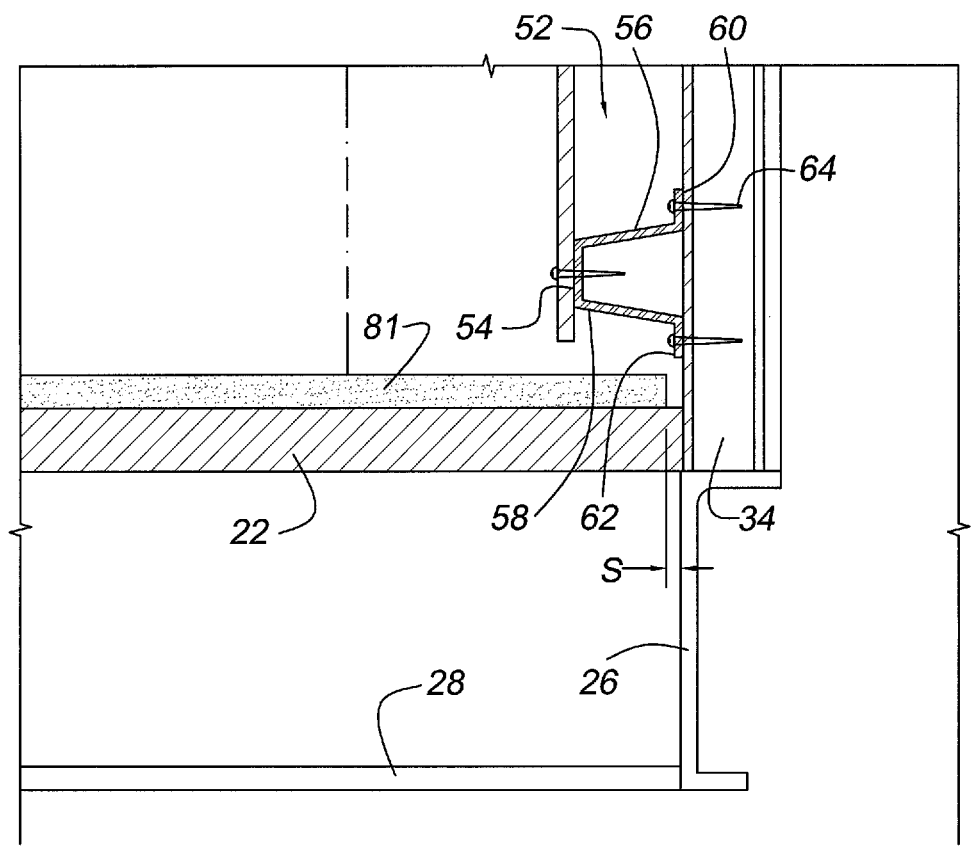
FIG. 8 is an enlarged end view of a horizontal channel attached to a vertical channel of a lengthwise side wall of a cargo container of a wind resistant modular ISO building in accordance with the present invention.
Figure 9:
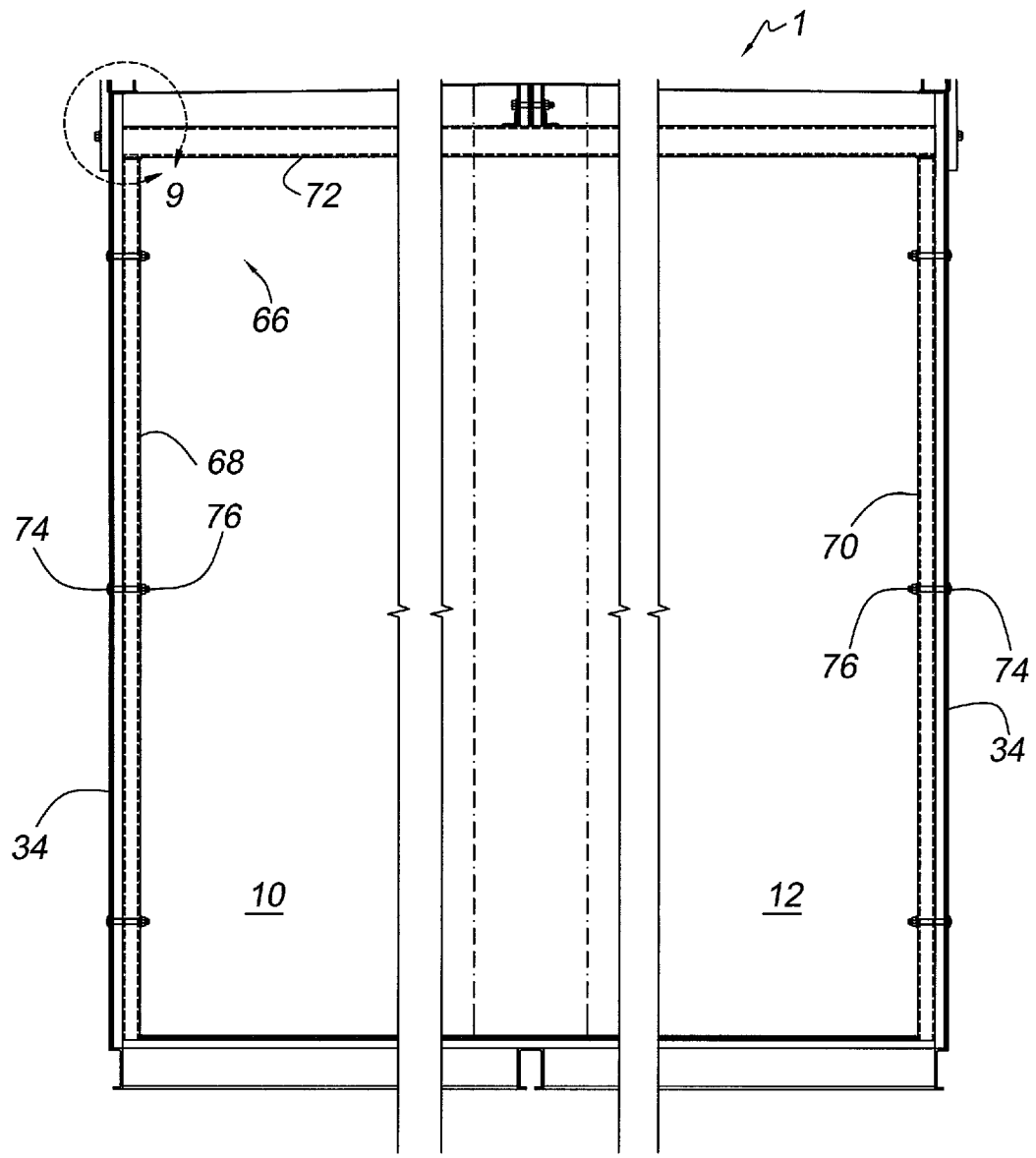
FIG. 9 is an end view of a moment frame attached to lengthwise side walls of first and second cargo containers of a wind resistant modular ISO building in accordance with the present invention.
Figure 10:
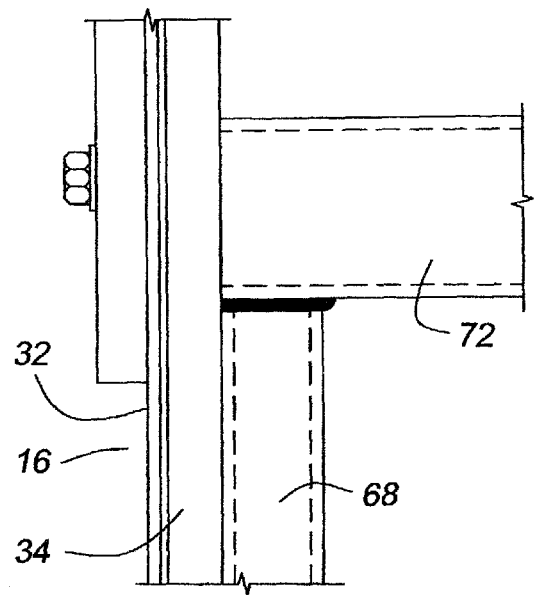
FIG. 10 is an enlarged end view of a vertical moment member attached to a horizontal moment member of a moment frame of a wind resistant modular ISO building in accordance with the present invention.
Figure 11:
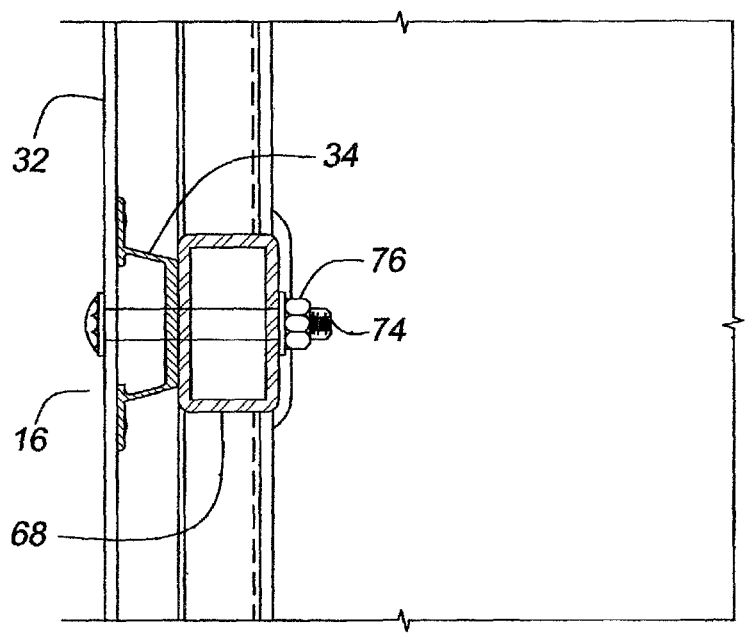
FIG. 11 is an enlarged top view of a vertical moment member of a moment frame attached to a vertical channel of a lengthwise side wall of a wind resistant modular ISO building in accordance with the present invention.

With reference to FIGS. 7-8, a plurality of horizontal channels 52 are attached to the plurality of vertical channels 34 of outer lengthwise side walls 16 of the first and second cargo containers 10, 12. The horizontal channel 52 includes a cross section with a lengthwise base member 54, a first leg 56, a second leg 58, a first flange 60 and a second flange 62. The first leg 56 extends outward from one end of the lengthwise base member 54 and the second leg 58 extends outward from the other end of the lengthwise member 54. The first flange 60 extends from the first leg 56 and the second flange 62 extends from the second leg 58. Two screws 64 are used to attach the horizontal channel 52 to each vertical channel 34.

With reference to FIGS. 5-6 and 9-11 at least two moment frames 66 are attached to an inside of the first and second cargo containers 10, 12. Each moment frame 66 includes a first vertical moment member 68, a second vertical moment member 70 and a horizontal moment member 72. A first end of the horizontal moment member 70 is attached to a top of the first vertical moment member 68 preferably with welding and a second end of the horizontal moment member 70 is attached to a top of the second vertical moment member 72 preferably with welding. The first vertical moment member 68 is attached to one of the plurality of vertical channels 34 on the lengthwise side wall 16 of the first cargo container 10 with a plurality of bolts 74 and a plurality of nuts 76. The second moment member 70 is attached to one of the plurality of vertical channels 34 on the lengthwise side wall 16 of the second cargo container 12 with the plurality of bolts 74 and the plurality of nuts 76. An upper portion of two adjacent vertical channels 34 of the first and second lengthwise wall 16 are attached to a top of the horizontal moment member 72 by welding a pair of angle members 78 thereto.

Figure 14:
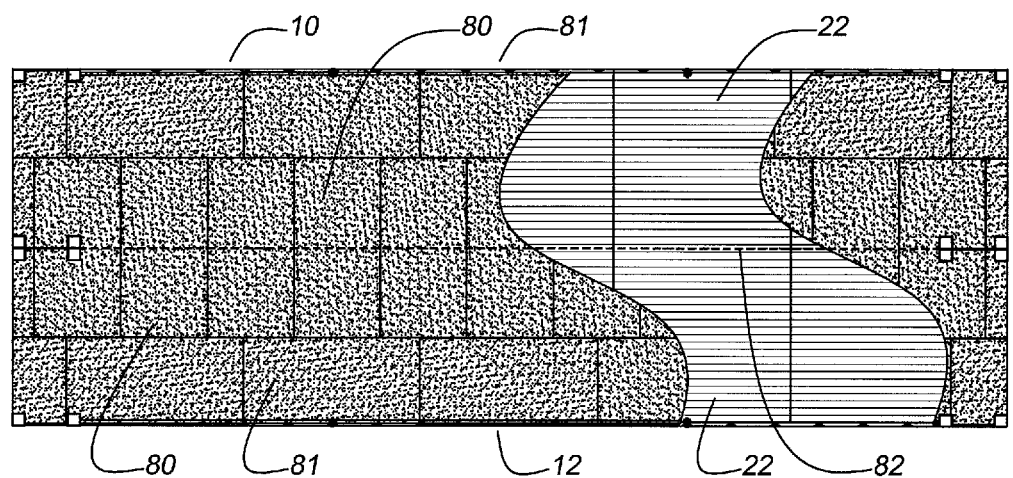
FIG. 14 is a top view of a plurality of cement boards arranged to form a floor for a wind resistant modular ISO building in accordance with the present invention.

With reference to FIG. 14, a plurality of cement boards 80, 81 are attached to the floor plates 22 of the first and second cargo containers with fasteners or the like. Each cement board preferably has a rectangular shape. It is preferable that the cement boards 80 are attached across a seam 82 between the first and second cargo containers 10, 12 in a lengthwise orientation. A length of the other cement boards 81 would be parallel to a length of the first and second cargo containers 10, 12. With reference to FIG. 8, it is preferable that an edge of the cement boards 81 be located a space "S" from the plurality of vertical channels 34. It is preferable that space "S" have a value of ½ inch, but other values could also be used.

With reference to FIG. 12, a gooseneck tunnel 84 is normally formed in a bottom of the cargo container 10, 12 at one end thereof. The first and second cargo containers 10, 12 are attached to each other, such that the two gooseneck tunnels 84 are located at opposing ends of the first and second cargo containers 10, 12. With reference to FIG. 2, a layer of foam 86 is sprayed on top of the top plates 20 of the first and second cargo containers 10, 12 to improve rigidity. A thickness of the layer of the foam 86 is preferably two inches, but other thicknesses may also be used. It is also preferable that the layer of foam 86 be a HSF 210 Polyurethane-Rigid-Spray-Foam, Class 1, but other foams may also be used. The foam may be purchased from ITWC, Inc. of Riverside, Calif.

Figure 15:
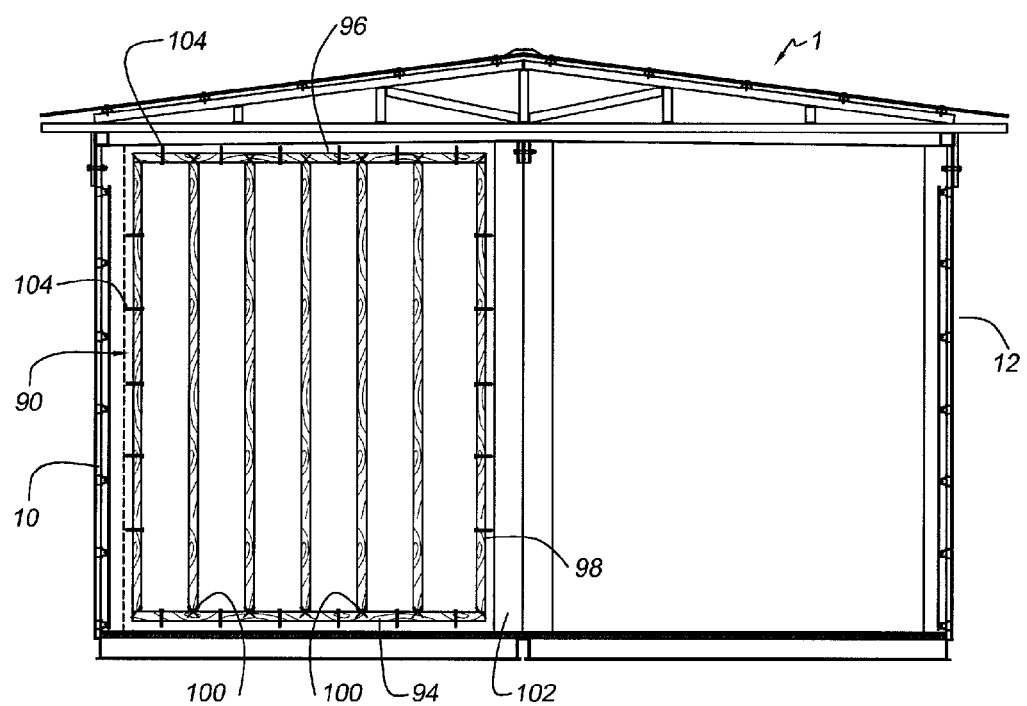
FIG. 15 is a front end view of a cargo container with an inner stud frame replacing an end door of a wind resistant modular ISO building in accordance with the present invention.

With reference to FIGS. 15-16, the end doors of the first and second cargo containers 10, 12 are replaced with an end panel 88. The end panel 88 preferably includes an inner stud frame 90 and an end plate 92. The inner stud wall 90 includes a bottom horizontal stud 94, a top horizontal stud 96 and a plurality of vertical studs 98. The bottom horizontal stud 94 is attached to one end of the plurality of vertical studs 98 with a plurality of fasteners 100 and the top horizontal stud 96 is attached to the other end of the plurality of vertical studs 98 with the plurality of fasteners 100. An outer perimeter of the inner stud frame 90 is attached to an inner perimeter of an end frame 102 of the cargo container 10, 12 with a plurality of fasteners 104. An inside surface of the end plate 92 is attached to an outer surface of the inner stud frame 90 and the end frame 104 with a plurality of fasteners 106.

Figure 17:
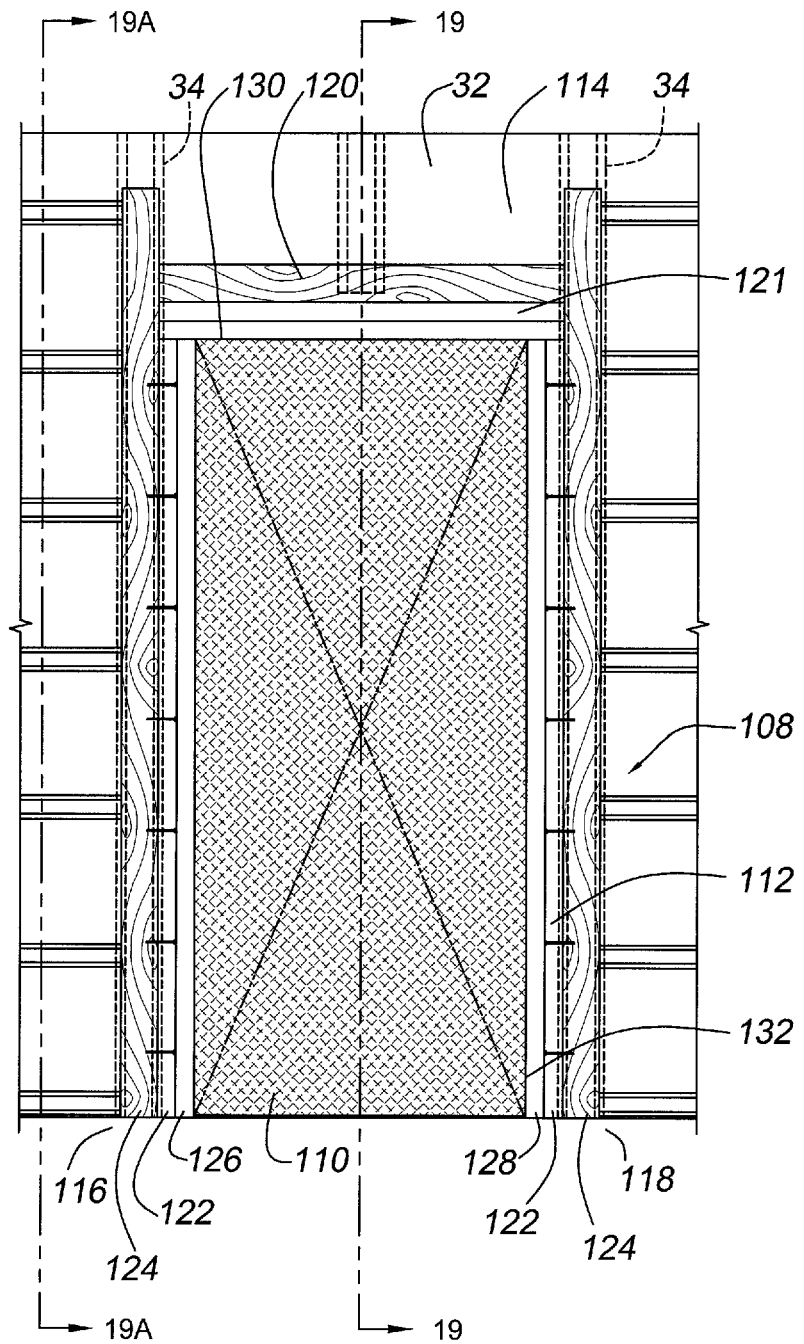
FIG. 17 is a front view of a door frame and a support frame formed in a lengthwise side wall of a wind resistant modular ISO building in accordance with the present invention.
Figure 18:
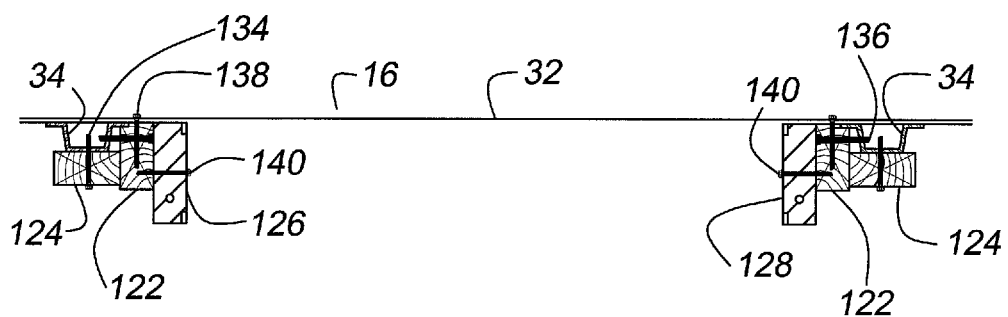
FIG. 18 is a top cross sectional view of a door frame and a support frame formed in a lengthwise side wall of a wind resistant modular ISO building in accordance with the present invention.

With reference to FIGS. 17-18, at least one door entrance 108 is formed in at least one of the lengthwise side walls 16 of the wind resistant modular ISO building 10, 12. Each door entrance 108 preferably includes a door 110, a door frame 112 and a support frame 114. The support frame 114 includes a first vertical support 116, a second vertical support 118 and a horizontal support 120. A header stud 121 is disposed below the horizontal support 120. Each vertical support 116, 118 includes a vertical member 122 and a vertical side member 124. The door 110 is pivotally retained in the door frame 112.

The door frame 112 includes a first vertical door frame member 126, a second vertical door frame member 128 and a horizontal door frame member 130. A door opening 132 is cut through the lengthwise side sheet 32, between two vertical channels 34. The first and second vertical side members 124 are attached to the two vertical channels 34 with fasteners 134. The first and second vertical members 122 are attached to the two vertical channels 34 with a plurality of fasteners 136 and to the lengthwise side sheet 32 with a plurality of fasteners 138. The first and second vertical door frame members 126, 128 are attached to an inside surface of the two vertical members 122 with a plurality of fasteners 140. The horizontal support 120 and the header stud 121 are attached between the two vertical members 122 with a plurality of fasteners (not shown).

Figure 19:
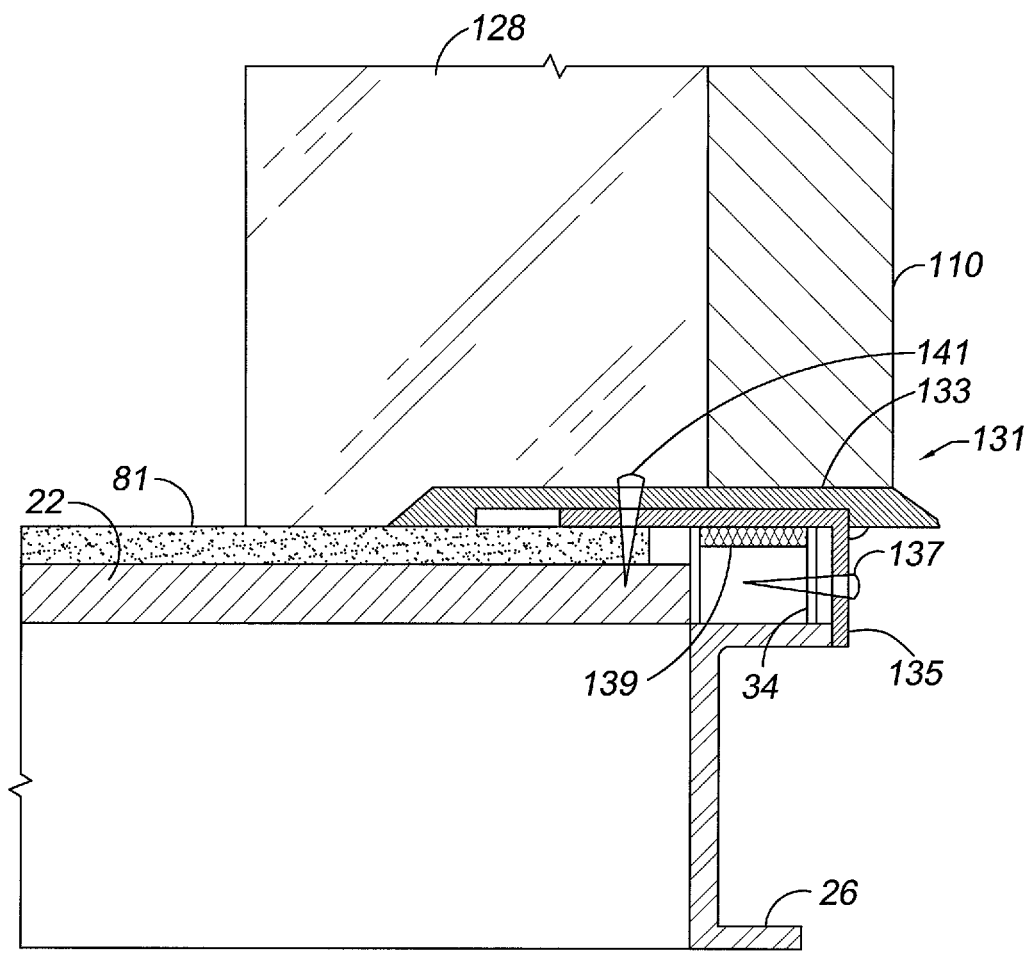
FIG. 19 is a cross sectional view of a door sill structure cut through a door of a wind resistant modular ISO building in accordance with the present invention.
Figure 19A:
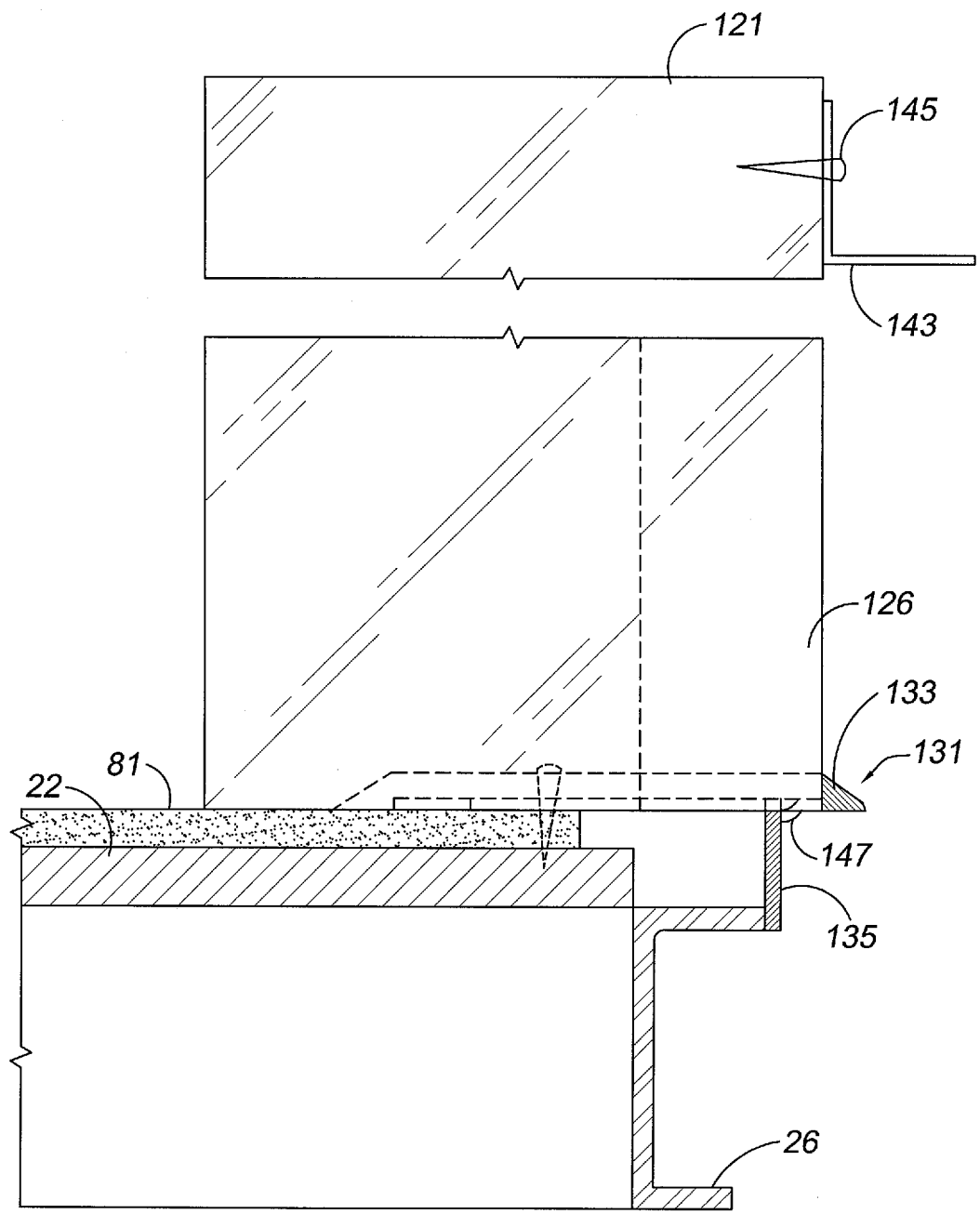
FIG. 19a is a cross sectional view of a door structure cut in front of a vertical door frame member of a wind resistant modular ISO building in accordance with the present invention.

With reference to FIGS. 19 and 19a, a door sill structure 131 preferably includes a door sill 133 and an angle member 135. Two vertical channels 34 located adjacent to the vertical door frame members 126, 128 are cut to a height that is flush with a height of the cement board 81. The angle member 135 is fastened to the vertical channels 34 with at least two fasteners 137. A sealant 139 is applied to a bottom of the angle member 135, before the angle member 135 is attached to the vertical channels 34. The door sill 133 is attached to a top of the angle member 135 with a plurality of fasteners 141. A water deflection angle member 143 is attached to horizontal door frame member 130 with at least two fasteners 145. A caulking sealant 147 is preferably applied to a junction of the door sill 133 and the angle member 135. The caulk sealant 147 is preferably a 100% silicon sealant, but other sealants may also be used.

Figure 20:
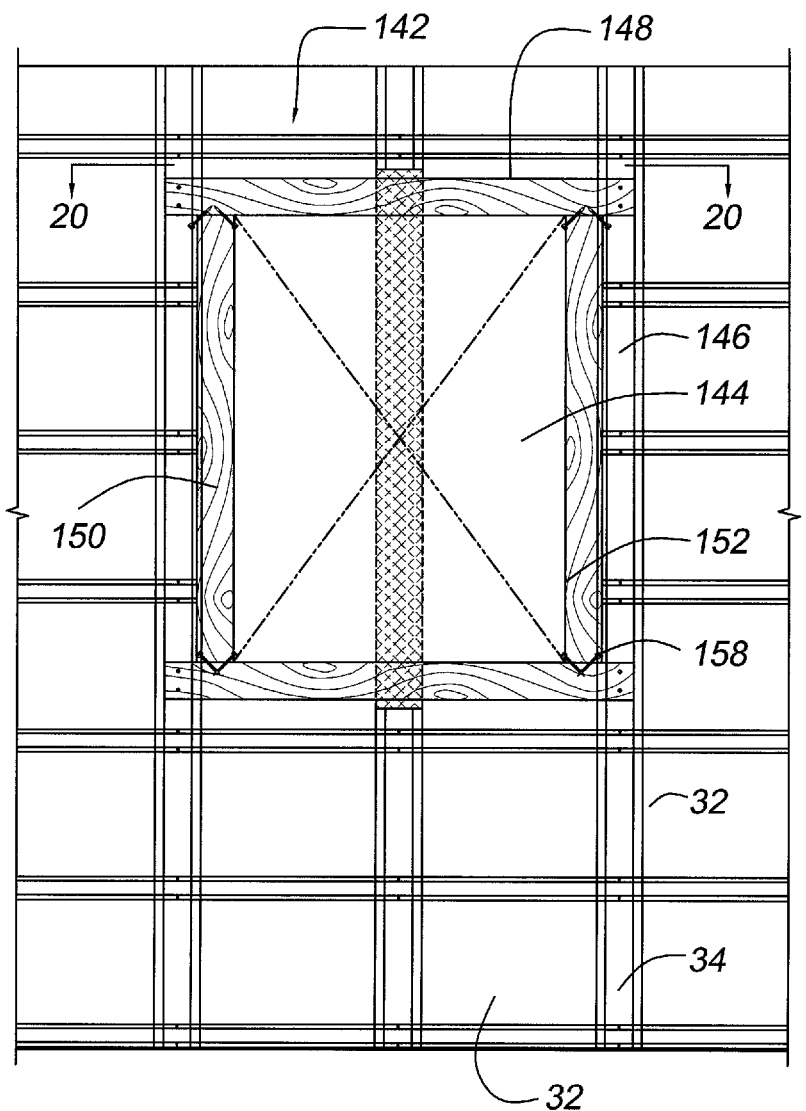
FIG. 20 is a front view of a window support frame formed in a lengthwise side wall of a wind resistant modular ISO building in accordance with the present invention.
Figure 21:
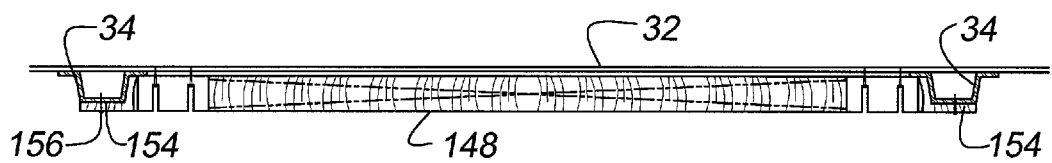
FIG. 21 is a top view of a window support frame formed in a lengthwise side wall of a wind resistant modular ISO building in accordance with the present invention.

With reference to FIGS. 20-21, at least one window system 142 is formed in at least one of the lengthwise side walls 16 of the wind resistant modular ISO building 1. Each window system 142 preferably includes a window 144 and a window support frame 146. The window support frame 146 includes two horizontal window support members 148 and two vertical window support members 150. A window opening 152 is cut through the lengthwise side sheet 32, between two vertical channels 34. A channel recess 154 is formed in each end of the two horizontal window support members 148. Each end of the two horizontal window support members 148 are secured to two vertical channels 34 with a plurality of fasteners 156. The two vertical window support members 150 are inserted and secured between the two horizontal window support members 148 with a plurality of fasteners 158. The window 144 is secured to the two horizontal window support members 148 and two vertical window support members 150.

Figure 22:
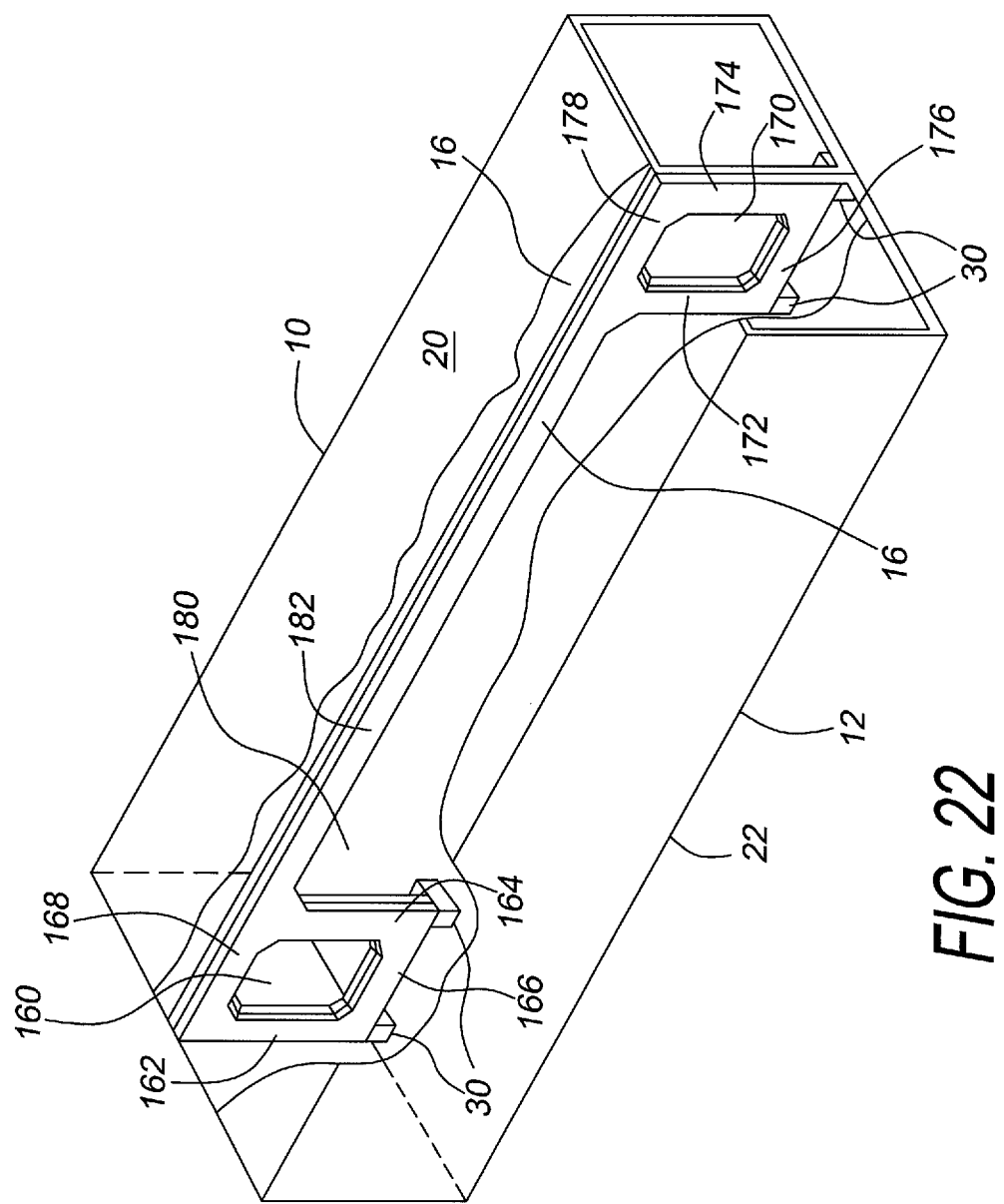
FIG. 22 is a perspective cutaway view of a wind resistant modular ISO building illustrating openings formed through bulkheads in inside walls of first and second cargo containers in accordance with the present invention.
Figure 23:
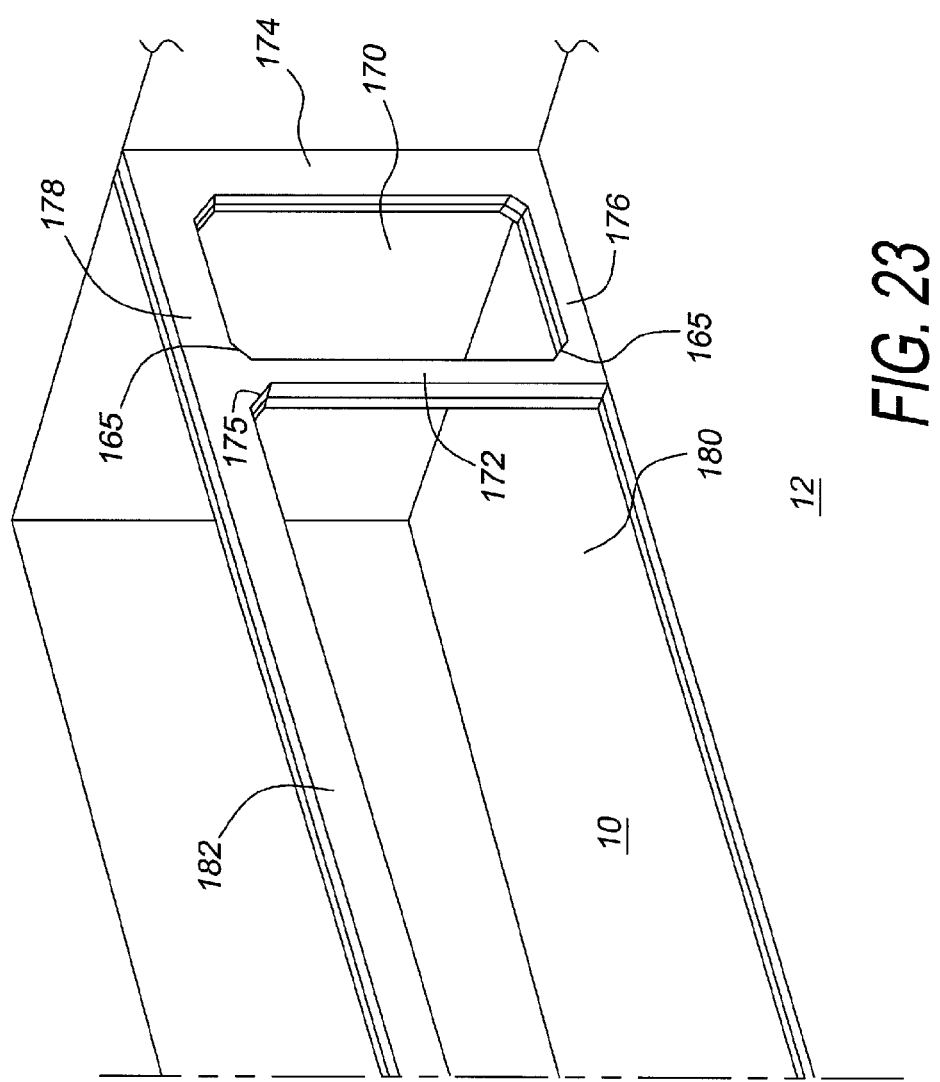
FIG. 23 is an enlarged perspective view of an inside of a wind resistant modular ISO building illustrating openings formed through bulkheads in inside walls of the first and second cargo containers in accordance with the present invention.

With reference to FIGS. 22-23, a bulkhead is typically formed in the side walls of a cargo container to provide the cargo container with structural integrity. The bulkhead includes two reinforced pillars located over grappler pockets 30. In order to make the wind resistant modular ISO building 1 more usable, it is preferable to remove as much of the inside walls 16 of the first and second cargo containers 10, 12. However, removing too much of the inside walls 16 will result in wind resistant modular ISO building 1 collapsing.

A first opening 160 is created through a first end of the first and second cargo containers 10, 12, between two adjacent grappler pockets 30. The first opening 160 creates two vertical pillars 162, 164, a bottom horizontal strip 166 and a top horizontal strip 168. The two vertical pillars 162, 164 are located over the two adjacent grappler pockets 30 in the first and second cargo containers 10, 12. The bottom and top horizontal strips 166, 168 are portions of the inside side wall 16 that extend upward from the floor 22 and downward from the top plate 20.

A second opening 170 is created through a second end of the first and second cargo containers 10, 12, between two adjacent grappler pockets 30. The second opening 170 creates two vertical pillars 172, 174, a bottom horizontal strip 176 and a top horizontal strip 178. The two vertical pillars 172, 174 are located over the two adjacent grappler pockets 30 in the first and second cargo containers 10, 12. The bottom and top horizontal strips 172, 174 are portions of the inside side wall 16 that extend upward from the floor 22 and downward from the top plate 20. A chamfer 165, a radius or the like is preferable formed in an inside corner of a junction of the vertical support members 172, 174 and the horizontal members 176, 178; and also the vertical support members 162, 164 and horizontal members 166, 168. A third opening 180 is created between outer vertical pillars 164, 172 of the first and second openings. The third opening 180 creates a horizontal support member 182, which extends downward from the top plate 20 between the outer pillars 164, 172. A chamfer 175, a radius or the like is preferable formed in an inside corner of a junction of the vertical support members 164, 172 and the horizontal support member 182.

The bottom frames 14 of the first and second cargo containers are supported by the mounting system (not shown). The pitched roof structure 15 is attached to a top and sides of the first and second cargo containers 10, 12. The wind resistant modular ISO building 1 is transportable from a manufacturing location to a use location without damaging the structure or contents in the wind resistant modular ISO building 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A wind resistant modular ISO building comprising:
a first cargo container having a first lengthwise side wall and a first floor plate;
a second cargo container having a second lengthwise side wall and a second floor plate;
a plurality of first vertical channels and a plurality of second vertical channels, said plurality of first and second vertical channels not being in contact with each other, each one of said plurality of said first and second vertical channels includes a lengthwise base member, a first leg, a second leg, a first flange and a second flange, said first leg extends outward from one end of said lengthwise base member and said second leg extends outward from a second end of said lengthwise base member, said first flange extends from said first leg and said second flange extends from said second leg, said first and second flanges of said plurality of first vertical channels are attached to an inner surface of said first lengthwise side wall, a first enclosed area is created within said inside surface of said lengthwise side wall with an inside surface of said first leg, said second leg and said lengthwise base member of one of said plurality of said first vertical channels, said first and second flanges of said plurality of second vertical channels are attached to an inner surface of said second lengthwise side wall, a second enclosed area is created within said inside surface of said lengthwise side wall with an inside surface of said first leg, said second leg and said lengthwise base member of one of said plurality of said second vertical channels; and at least one door entrance is formed in at least one of said first and second lengthwise side walls, one of said at least one door entrance includes a door, a door frame and a support frame, said support frame includes a first vertical member, a second vertical member, a first vertical side member, a second vertical side member, said door frame is attached to said first and second vertical members, said door is pivotally retained in said door frame, said first vertical member is attached to said first or second leg of one of said plurality of vertical channels, said second vertical member is attached to said first or second leg of an adjacent vertical channel of said plurality of vertical channels, said first vertical side member is attached to said lengthwise base member of one of said plurality of vertical channels, said second vertical member is attached to said lengthwise base member of said adjacent vertical channel.

2. The wind resistant modular ISO building of claim 1, further comprising:

a door sill structure includes a door sill and an angle member, each end of said angle member is attached to two adjacent vertical channels of said plurality of vertical channels, said door sill is attached to a top of said angle member.

3. The wind resistant modular ISO building of claim 1, further comprising:

at least one moment frame being retained on an inside perimeter of said first and second cargo containers, each one of said at least one moment frame includes a first vertical moment member, a second vertical moment member and a horizontal moment member, said first vertical moment member is secured to an inside surface of said first lengthwise side wall, said second vertical moment member is secured to an inside surface of said second lengthwise side wall, a top junction is attached to a top of said horizontal moment member.

4. The wind resistant modular ISO building of claim 1, further comprising:

a plurality of horizontal channels are attached to said plurality of vertical channels across substantially a length of said lengthwise side wall.

5. The wind resistant modular ISO building of claim 1, further comprising:

a horizontal support is retained between said first and second vertical members.

6. A wind resistant modular ISO building comprising:

a first cargo container having a first lengthwise side wall and a first floor plate;

a second cargo container having a second lengthwise side wall and a second floor plate;

a plurality of first vertical channels and a plurality of second vertical channels, said plurality of first and second vertical channels not being in contact with each other, each one of said plurality of said first and second vertical channels includes a lengthwise base member, a first leg, a second leg, a first flange and a second flange, said first leg extends outward from one end of said lengthwise base member and said second leg extends outward from a second end of said lengthwise base member, said first flange extends from said first leg and said second flange extends from said second leg, said first and second flanges of said plurality of first vertical channels are attached to an inner surface of said first lengthwise side wall, a first enclosed area is created within said inside surface of said lengthwise side wall with an inside surface of said first leg, said second leg and said lengthwise base member of one of said plurality of said first vertical channels, said first and second flanges of said plurality of second vertical channels are attached to an inner surface of said second lengthwise side wall, a second enclosed area is created within said inside surface of said lengthwise side wall with an inside surface of said first leg, said second leg and said lengthwise base member of one of said plurality of said second vertical channels;

at least one door entrance is formed in at least one of said first and second lengthwise side walls, one of said at least one door entrance includes a door, a door frame and a support frame, said support frame includes a first vertical member, a second vertical member, a first vertical side member, a second vertical side member, said door frame is attached to said first and second vertical members, said door is pivotally retained in said door frame, said first vertical member is attached to said first or second leg of one of said plurality of vertical channels, said second vertical member is attached to said first or second leg of an adjacent vertical channel of said plurality of vertical channels, said first vertical side member is attached to said lengthwise base member of one of said plurality of vertical channels, said second vertical member is attached to said lengthwise base member of said adjacent vertical channel; and at least one window system is formed in at least one of said first and second outer lengthwise side wall, said at least one window system includes a window and a window support frame, said window support frame includes two horizontal window support members and two vertical window support members.

7. The wind resistant modular ISO building of claim 6, further comprising:

a channel recess is formed in each end of said horizontal window support members, said channel recess is sized to receive one of said plurality of vertical channels, said horizontal window support member is attached to two adjacent of said plurality of vertical channels.

8. The wind resistant modular ISO building of claim 6, further comprising:

a door sill structure includes a door sill and an angle member, each end of said angle member is attached to two adjacent vertical channels of said plurality of vertical channels, said door sill is attached to a top of said angle member.

9. The wind resistant modular ISO building of claim 6, further comprising:

at least one moment frame being retained on an inside perimeter of said first and second cargo containers, each one of said at least one moment frame includes a first vertical moment member, a second vertical moment member and a horizontal moment member, said first vertical moment member is secured to an inside surface of said first lengthwise side wall, said second vertical moment member is secured to an inside surface of said second lengthwise side wall, a top junction is attached to a top of said horizontal moment member.

10. The wind resistant modular ISO building of claim 6, further comprising:
   a plurality of horizontal channels are attached to said plurality of vertical channels across substantially a length of said lengthwise side wall.

11. The wind resistant modular ISO building of claim 6, further comprising:
   a horizontal support is retained between said first and second vertical members.

\* \* \* \* \*